United States Patent
Miller et al.

[15] 3,681,416
[45] Aug. 1, 1972

[54] PROCESS FOR THE PRODUCTION OF METAL CHELATES

[72] Inventors: Ralph Miller, Pleasantville, N.Y.; Jorg H. Hoffmann, McIntosh, Ala.

[73] Assignee: Ciba-Geigy Corporation, Ardsley, N.Y.

[22] Filed: Oct. 29, 1968

[21] Appl. No.: 771,653

[52] U.S. Cl............260/429 J, 260/429.9, 260/438.1, 260/439 R, 260/534 E
[51] Int. Cl. ......C07f 13/00, C07c 99/10, C07f 15/00
[58] Field of Search............................260/429, 534 E

[56] References Cited

UNITED STATES PATENTS

| | | | |
|---|---|---|---|
| 3,409,666 | 11/1968 | Foreman | 260/534 |
| 3,078,289 | 2/1963 | Rowland et al. | 260/429.7 |

OTHER PUBLICATIONS

Industrial and Engineering Chem., Vol. 52, (1960) p. 194.

Chaberek et al., Organic Sequestering Agents, John Wiley and Sons Inc., New York, N.Y., 1959, pages 228–229.

Bersworth, Versene (Technical Bulletin No. 1, 1949), Bersworth Chemical Co. pages 4–5.

Pfeiffer et al., Chem. Bericlote Vol. 75 (1942) p. 1–12.

Schwarzenbach et al., Helv. Chem. Acta. Vol. 31, p. 459–465.

Brintzinger et al., Zeit. Anorg Allgem. Chem. 251 (1943), pp. 285–294.

*Primary Examiner*—Tobias E. Levow
*Assistant Examiner*—A. P. Demers
*Attorney*—Karl F. Jorda, Bruce M. Collins and Martin J. Spellman, Jr.

[57] ABSTRACT

Method for the production of metal chelates by reacting an amino nitrile with sodium or potassium hydroxide and a metal oxide, or metal hydroxide. The metal chelates thus obtained are useful in correcting soil deficiencies and as nutrients for plants.

7 Claims, No Drawings

PROCESS FOR THE PRODUCTION OF METAL CHELATES

1. Field of the Invention

The present invention relates to the method for the production, in extremely high yield, of sodium or potassium polyvalent metal chelates by a process involving reacting, at a temperature between about 80°C and about 110°C, (a) an amino nitrile with (b) an aqueous solution of sodium or potassium hydroxide and (c) a metal oxide, or metal hydroxide.

The metal chelates thus obtained are commercially valuable compounds which are employed in correcting minor element deficiencies in plants or as micronutrients for plants. The chelates can be applied to the plants either in dry or in liquid form by conventional procedures and are used in amounts of up to about 10 lbs. per acre or up to about a 1 percent solution or even in higher concentrated solutions.

A typical embodiment of the present invention involves reacting, at a temperature between about 80°C and about 110°C, an amino nitrile with sodium or potassium hydroxide, in an aqueous medium; and a metal oxide, or metal hydroxide.

2. Description of the Prior Art

In the past, a typical chelate, disodium zinc ethylenediamine tetraacetate, was prepared by first reacting ethylenediamine with HCN and formaldehyde to obtain the tetra-nitrile; the last mentioned compound was then reacted with an alkali metal such as sodium or potassium hydroxide to obtain tetra-sodium or tetra-potassium ethylenediamine tetraacetate. The next step in the synthesis involved mixing and reacting stoichiometric quantities of ethylenediamine tetraacetic acid, zinc oxide or zinc carbonate and a solution of tetrasodium ethylenediamine tetraacetate. In this last step, ethylenediamine tetraacetic acid was first prepared by acidifying a solution of tetrasodium ethylenediamine tetraacetate with a mineral acid such as, for example, sulfuric acid or hydrochloric acid to form a solution of either sodium sulfate or sodium chloride (or potassium sulfate or potassium chloride) and an insoluble precipitate of ethylenediamine tetraacetic acid. The aforesaid solid was then separated from the sodium salt solution by any convenient means and then washed free from the adhering salt solution. This was followed by reacting the ethylenediamine tetraacetic acid with tetrasodium ethylenediamine tetraacetate and either zinc oxide or zinc carbonate to form the desired product that is, disodium zinc ethylenediamine tetraacetate. The aforesaid reactions are repre-sented by the following equations:

1. EDA + 4HCN + 4HCHO → (NC—CH$_2$)$_2$—N—CH$_2$—CH$_2$—N(CH$_2$—CN)$_2$
2. (NC—CH$_2$)$_2$—N—CH$_2$—CH$_2$—N—(CH$_2$—CN)$_2$ + 4NaOH → Na$_4$EDTA + 4NH$_3$
3. Na$_4$EDTA + 2H$_2$SO$_4$ → EDTA + 2Na$_2$SO$_4$
4. EDTA + Na$_4$ EDTA + 2ZnO → 2EDTA Na$_2$Zn + 2H$_2$O

Using the above procedure, disodium zinc ethylenediamine tetra-acetate was obtained in the form of a concentrated solution and if a solid product was desired, the water in the solution was evaporated by conventional procedures as, for example, by use of a drum dryer or a spray dryer.

The reactions indicated above show that for each molecule of chelated zinc, there was formed a molecule of sodium sulfate, and four molecules of sodium hydroxide and one molecule of sulfuric acid were utilized. In addition, it was necessary to prepare the tetraacetonitrile of EDA, hydrolyze it with caustic to obtain tetrasodium ethylenediamine tetraacetate, react half of this material with acid to form the EDTA acid, isolate this acid and then free it from impurities. A mixture of equal amounts of EDTA and Na$_4$EDTA produced the EDTANa$_2$ solution which chelated with ZnO to form the corresponding EDTA Na$_2$Zn.

SUMMARY OF THE INVENTION

In accordance with the present invention, metal chelates are obtained in extremely high yield by a rather simple, practical and thoroughly inexpensive procedure which involves reacting an amino nitrile with a sodium or potassium hydroxide solution and either a metal oxide or metal hydroxide or . Using this procedure, the desired product is obtained in a single step (following the preparation of the aminonitrile) and there are avoided all of the disadvantages of the prior art procedure described above. In addition, because of its simplicity, the present process is ideally suited for commercial or large scale production.

Thus, by using the present process, there is obtained not only considerable savings in use of the starting chemical reactants that is, reduction in the amount of sodium or potassium hydroxide used as well as obviating the need for the mineral acid but in addition, the present process obviously is a simple and economically feasible procedure whereby the desired product is directly obtained

PREFERRED EMBODIMENTS OF THE INVENTION

In accordance with a preferred embodiment of the invention, an amino nitrile is reacted with sodium or potassium hydroxide and either a metal oxide or metal hydroxide or to produce the desired metal chelate, in high yield.

The metal chelate obtained in the present process is represented by the formula

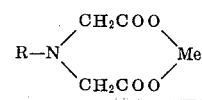

wherein
Me is a divalent metal ion selected from the group consisting of calcium, copper, iron, nickel, cobalt, magnesium, manganese and zinc; and
R is —CH$_2$—CH$_2$—N(CH$_2$COONa)$_2$ or —CH$_2$—CH$_2$N(CH$_2$OOK)$_2$.

Of the aforesaid divalent metal oxides, zinc oxide, copper oxide and manganese oxide are preferred.

The amino nitrile reactant used in the present procedure is represented by the formula

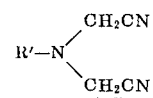

wherein R' is (NCCH$_2$)$_2$—N—CH$_2$—CH$_2$—. The process is carried out at a temperature between about 80° C. and about 110° C.; the preferred reaction temperature is about 85° C. Within the aforesaid temperature range, the amino nitrile begins to hydrolyze and the hydrolysis is accompanied by the evolution of ammonia. The course of the reaction can be followed by titrating the evolved ammonia with a mineral acid such as, for example, hydrochloric acid or sulfuric acid. To facilitate the complete removal of the ammonia, air or an inert gas is bubbled through the reaction mixture, at the end of the reaction. Depending on the reactants used and the reaction temperature, the reaction generally occurs over a period of time varying between about 10 and 600 minutes.

It is preferred, but not essential, that the reaction should be conducted in an inert atmosphere such as, for example, in a nitrogen atmosphere, as it has been found that this will minimize or avoid undesirable oxidation reactions.

Typical metal oxides or, hydroxides which are used in the present process include, for example, copper oxide, manganese oxide, zinc oxide or, calcium hydroxide.

Generally, the amino nitrile and the divalent metal reactant are used in equimolar amounts and it is generally preferred that this should be about 0.5 to 1.0 moles. As for the amount of sodium or potassium hydroxide used, at the minimum this should be at least twice the amount of either the amino nitrile or divalent metal reactant and generally, when 0.5 mole of the aforesaid reactants is used, then 1.0 mole of sodium hydroxide or potassium hydroxide is usually used, in order to effect the reaction.

In a specific embodiment of the invention, ethylenediamine tetraacetonitrile is reacted with a solution of sodium hydroxide and solid, powdered zinc oxide, in the proportions shown by the following simplified equation:

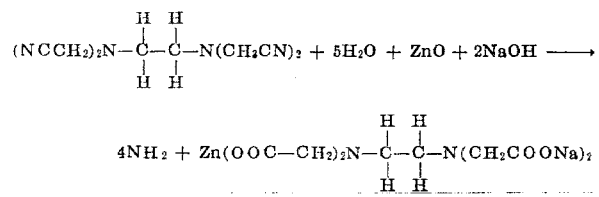

to obtain the zinc chelate product.

The following non-limitative examples are used to illustrate the process of the invention. Unless otherwise indicated, parts are given by weight and the temperatures are in degrees centigrade.

EXAMPLE I 109 g. (0.5 mole) ethylenediamine tetraacetonitrile, 80 g. (1 mole) of sodium hydroxide (50 percent) and 435 g. of water were charged to a round bottom flask and heated, accompanied by vigorous stirring. At 85° C., the nitrile began to hydrolyze and the ammonia was absorbed and titrated with hydrochloric acid. After 10 minutes, the hydrolysis was far enough advanced that a clear solution was obtained and 41.0 g. (0.5 mole) of zinc oxide were added. Twenty minutes later the ammonia evolution slowed down and air was bubbled through the reaction mixture to facilitate the ammonia removal. A clear yellow solution was obtained. On drying, there was obtained, in a yield of 86 percent, disodium zinc ethylenediamino tetraacetate in the form of a slightly yellow colored powder.

Following the procedure described above except for the replacement of zinc oxide by copper oxide and using 0.5 mole of said copper oxide, there was obtained the corresponding copper chelate compound.

EXAMPLE II 109 g. (0.5 mole) of ethylenediamine tetraacetonitrile, 82 g. (1.0 mole) of sodium hydroxide (50 percent) and 435 g. of water were charged to a round bottom flask and heated, under vigorous stirring. At a temperature ranging between 85° C. and 94° C., evolution of ammonia was observed and this was confirmed by titration with sulfuric acid. After 5 minutes, the hydrolysis was far enough advanced and 39.0 g. (0.5 mole) of calcium hydroxide were added. To facilitate the ammonia removal, air was bubbled through the reaction mixture. The mixture was diluted with water and boiled and filtered hot. The product, disodium calcium ethylenediamino tetraacetate, was obtained in a yield of 97.3 percent.

It should be understood that various changes may be made in the preferred embodiments of the process described hereinabove. Accordingly, the preceding description is intended to be illustrative only and should not be considered in a limited sense.

What is claimed is:

1. A process for the preparation of a metal chelate of the formula

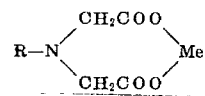

wherein
Me is a divalent metal ion selected from the group consisting of calcium, copper, iron, magnesium, manganese, zinc, nickel and cobalt; and
R is a member selected from the group consisting of —CH$_2$—CH$_2$—N(CH$_2$COONa)$_2$ and —CH$_2$—CH$_2$—N(CH$_2$COOK)$_2$ which comprises reacting, at temperatures between 80° and 110° C.,
a. an amino nitrile of the formula

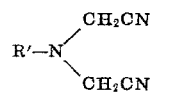

wherein
R' is (NCCH$_2$)$_2$—N—CH$_2$—CH$_2$; with
b sodium or potassium hydroxide; and
c a metal oxide or metal hydroxide, said metal being a divalent metal selected from the group consisting of copper, iron, magnesium, manganese, zinc, calcium, nickel and cobalt, in a molar ratio of (a):(b):(c) of essentially 1:2:1.

2. A process according to claim 1, wherein the reaction is conducted at a temperature of about 85° C.

3. A process according to claim 1, wherein the metal oxide used is zinc oxide or copper oxide.

4. A process according to claim 1, wherein the metal hydroxide used is calcium hydroxide.

5. A process according to claim 1, wherein disodium zinc ethylenediamino tetraacetate is obtained by hydrolyzing ethylenediamine tetraacetonitrile with sodium hydroxide followed by reacting the hydrolysis product with zinc oxide.

6. A process according to claim 1, wherein disodium calcium ethylenediamino tetraacetate is obtained by hydrolyzing ethylenediamine tetraacetonitrile with sodium hydroxide followed by reacting the hydrolysis product with calcium hydroxide.

7. A process for the preparation of bivalent metal chelates of di-alkali metal salts of ethylenediamine tetraacetic acid which comprises reacting:
   a. ethylenediamine tetraacetonitrile with
   b. sodium or potassium hydroxide and
   c. the oxide or hydroxide of a bivalent metal, said metal being selected from the group consisting of copper, iron, magnesium, manganese, zinc, calcium, nickel and cobalt;
   the molar ratio of (a):(b):(c) being essentially 1:2:1 and the reaction being effected in an aqueous medium at a temperature of the order of 100°C and being continued to completion of ammonia evolution.

* * * * *